Feb. 28, 1961 YASUSHI HOSHINO ET AL 2,973,410

PRESSING PLATE OF A MAGNETIC SOUND RECORD READING MACHINE

Filed April 29, 1959

2,973,410
Patented Feb. 28, 1961

2,973,410

PRESSING PLATE OF A MAGNETIC SOUND RECORD READING MACHINE

Yasushi Hoshino, 462 1-chome, Tamagawa-Okusawacho, Setagaya-ku, and Minoru Sato, 635 Ishikawacho Apt., 168 Ishikawa-cho, Ota-ku, both of Tokyo, Japan Filed Apr. 29, 1959, Ser. No. 809,656

Claims priority, application Japan May 2, 1958

3 Claims. (Cl. 179—100.2)

The inventor of the present application invented a magnetic sound record reading machine some time ago, the construction of which is as described hereafter. The present invention relates to the improvement of the pressing plate of said magnetic sound record reading machine.

The object of the present invention is to provide a pressing plate provided with a hole or window which enables writing on a magnetic sound record sheet during the operation of sound recording or sound reproducing by a magnetic sound record reading machine.

Another object of this invention is to provide such a hole or window in the pressing plate without affecting good contact between a magnetic sound record sheet and a sound recording and reproducing head of a magnetic sound record reading machine.

Still another object of the present invention is to provide a magnetic sound record reading machine which can be used conveniently by a blind man.

The features and advantages of the present invention will be well understood from the following explanations made with reference to the accompanying drawings, wherein.

Figures 1, 2, 3, 4, 5, 6, 7:
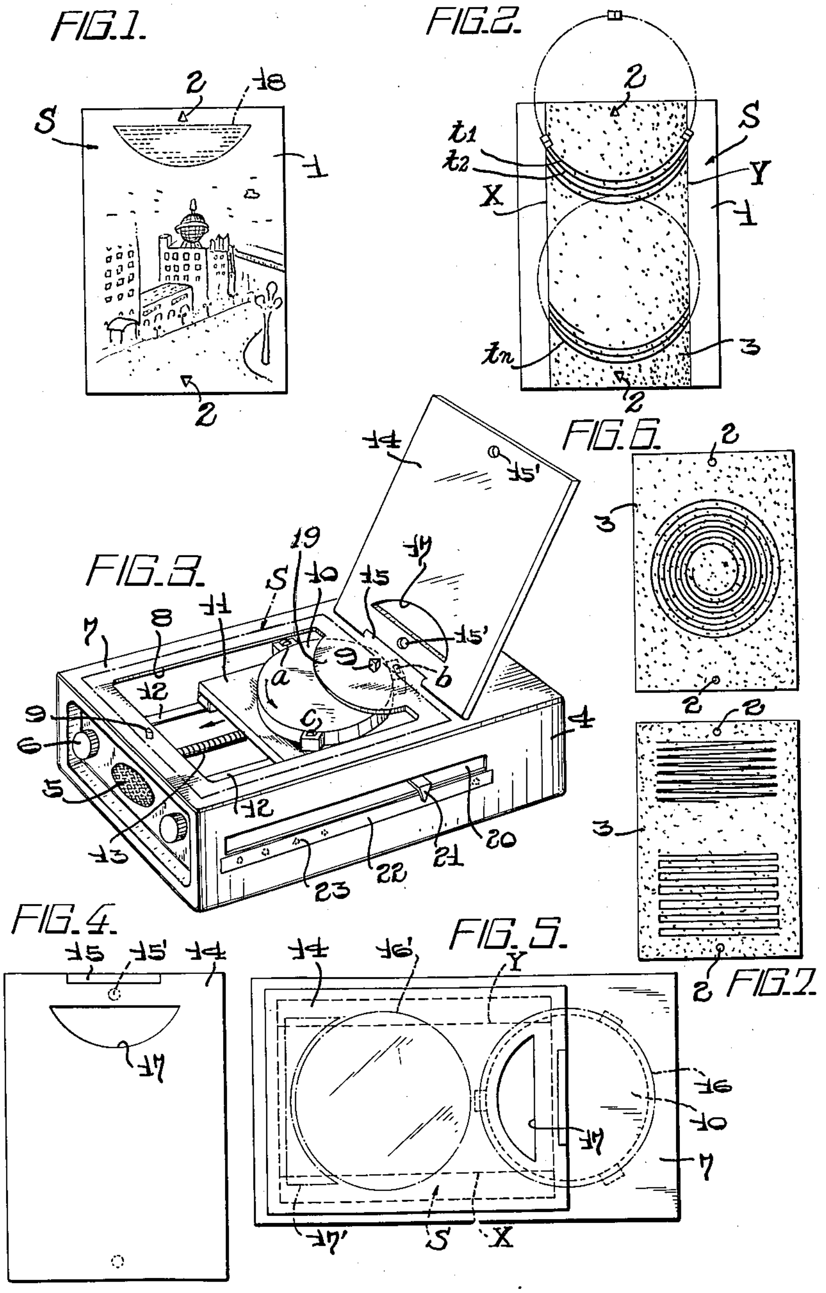
Fig. 1 is a front plan view of a magnetic sound record sheet on which descriptions have been made through a window of the pressing plate according to the present invention.
Fig. 2 is a back view of a magnetic sound record sheet of Fig. 1.
Fig. 3 is a general perspective view of a magnetic sound record reading machine having a pressing plate provided with a window according to the present invention.
Fig. 4 is a plan view of the pressing plate having a window hole according to the present invention.
Fig. 5 is a plan view showing the relative position of the turn table of a magnetic sound record reading machine and a magnetic sound record sheet mounted thereon.
Fig. 6 is a plan view of a magnetic sound record sheet having a magnetic sound track of spiral form.
Fig. 7 is a plan view of a magnetic sound record sheet having a magnetic sound track of zig-zag line.

In order to facilitate good understanding of the present invention, explanation will be made with regard to the magnetic sound record reading machine in which the pressing plate of the present invention is used.

The magnetic sound record sheet S used on the magnetic sound record reading machine is made of a sheet of paper 1 and has description on the front surface as shown in Fig. 1 and a magnetic coating film 3 on the back surface as shown in Fig. 2. The magnetic coating film is a film coated on the back surface of the sheet 1 by painting or printing a material comprising powder of a magnetic material such as $\gamma$-$Fe_2O_3$ or $Fe_3O_4$ between two parallel lines X and Y. On this magnetic coating film, sound tracks $t_1$, $t_2$ . . . $t_n$ are formed and reproduced by the magnetic sound record reading machine as explained hereafter. The sheet has setting holes 2, 2 which set the sheet on a definite position on the magnetic sound record reading machine in cooperation with the setting pins 9 of the machine as explained later.

The magnetic sound record reading machine has a casing 4 (Fig. 3) provided with a speaker 5 and an electric control part 6. On the casing 4, a panel plate 7 having a window 8 is mounted. On this panel plate 7, setting pins 9, 9 are provided to engage with the setting holes 2, 2 of the magnetic sound record sheet S. Below the panel plate 7, a turn table 10 is rotatably mounted on a shiftable table 11. A plurality of sound recording and reproducing heads (in the example, three heads *a*, *b* and *c*) are mounted on the periphery of the turn table 10 at equal intervals which is equal to the distance between the two parallel lines X and Y of the magnetic record sheet S.

The shiftable table 11 is driven by a helical rod 13 which is rotated by a mechanism not shown to slide on rails 12, 12. On the casing 4 is hinged a transparent pressing plate 14 at 15. In the drawing, 15′ are escape holes provided in the pressing plate so that when the plate is lowered, setting pins 9 on the panel plate will not hinder the lowering of the plate. After placing a magnetic coating film S facing the back surface having the magnetic coating film 3 downwardly on the panel plate 7 in the position as illustrated by dot-chain line in Fig. 3 by engagement of the setting holes 2 of the sheet and the setting pins 9 of the panel plate 7, the pressing plate 14 is lowered to press the sheet S.

In this position, the turn table 10 is rotated and at the same time the shiftable table 11 is longitudinally shifted and the heads *a*, *b*, *c* on the turn table 10 come in contact with the magnetic coating film one by one to record the sound tracks $t_1$, $t_2$ . . . $t_n$ as shown in Fig. 2 or to scan the tracks to reproduce the recorded sound. In this apparatus, the sound record sheet is maintained in a fixed position and the pressing plate 14 is transparent, and therefore one can read the descriptions on the front surface of the sheet readily while the sound is being recorded or reproduced. Thus one can attain simultaneously hearing and seeing to promote good understanding of the content of the sheet or to increase the enjoyment of the sheet. This is the general principle of the magnetic sound record reading machine.

The apparatus described above is very useful for various purposes, for example, for learning a foreign language. However, as will be seen, the whole surface of the sheet S is under the pressing plate 14 and when one desires to write thereon, it is impossible to do so. There are cases where one desires to write while the sheet is being recorded or reproduced. In order to solve this problem, according to the present invention, a window hole 17 is provided in the pressing plate 14 as shown in Fig. 4. Now even after the pressing plate 14 is lowered on a sheet one can approach the surface of the sheet through the window hole 17 and write on the part of the sheet corresponding to the window hole. Thus the utility of the magnetic sound record reading machine will be promoted. In providing the window hole, however, the locality must be selected.

In order to secure good contact between the magnetic coating film and the head, it is necessary to have some support for the sheet, since the head is urged upwardly to maintain good contact with the magnetic coating film and the sheet made of paper is flexible and yieldable. If there is no support for the paper sheet 1, the sheet will yield upwardly at the point of the contact with the head and the sheet cannot be maintained in flat condition. Under such condition, it is hardly possible to attain good recording or reproducing. The main purpose of the pressing plate 14 is to afford a support to the sheet so that the sheet will not be raised up by the head in operation. In Fig. 5, line 16 represents the locus of a head of the turn table 10 in the starting position and line 16' represents the locus of a head of the turn table in the end of the operation. In this case, the part where a head in operation comes into contact with the sheet is a part demarcated by lines 16, 16', X and Y. Accordingly the window hole is provided outside of said part as shown by 17 in Fig. 4 and by 17' in Fig. 5. Of course, any part outside of the part mentioned above may be selected for the provision of the window hole, and the principle of this invention is applicable as well to the case when the magnetic sound record sheet has a sound track of spiral form as illustrated in Fig. 6 or a sound track of zig-zag line as illustrated in Fig. 7.

When one writes on the part 18 of the sheet S through the window hole 17 of the pressing plate, if the sheet is not supported from the bottom, it is likely to cause difficulties. Accordingly, it is advisable to make the window of the panel plate 7 not to extend to the part corresponding to the window hole 17 of the pressing plate 14.

In Fig. 3, the part indicated by 19 is a part of the panel plate 7 corresponding to the window hole 17 of the pressing plate. Since this part is not to be scanned by a head in operation, it is easy to leave such a part on the panel plate when the window 8 of the panel plate 7 is cut off.

In another aspect of the present invention, on the front surface of the sheet, descriptions in braille points may be made in the part 18 corresponding to the window hole 17. With such a record sheet, a blind man can select the sheet he desires, or he can read the record while hearing the sound of the record sheet.

If the sound record sheet having descriptions in braille points is mounted on a magnetic sound recording machine with a conventional pressing plate with no window hole, the braille points on the surface of the sheet will be worn out very rapidly by the pressing plate, but when the pressing plate has a window hole as described above, the braille points will not come into contact with the pressing plate, and hence the braille points can last for a long time.

When the magnetic sound record reading machine is to be used by a blind man, it is advisable to provide a slot 20 on the side wall of the casing 4 and an indication pin 21 projecting from the slot 20 and movable according to the longitudinal shift of the shiftable table 11 to indicate the position of the shiftable table 11 and consequently the position of the turn table 10, and a scale 22 along the slot 20 having letters 23 written in braille points. With such an apparatus, a blind man can know the position of the turn table 10 by groping the side of the casing 4 with a hand.

What we claim is:

1. A magnetic sound recording and reproducing apparatus for use with a magnetic sound record sheet having on one surface a magnetic coating film and on the other surface visible marks, said apparatus comprising a panel plate provided with a window opening for exposing the magnetic coating film of the magnetic sound record sheet, a transparent pressing plate adapted to sandwich the magnetic sound record sheet against the panel plate and to enable the visible marks to be seen, a turntable rotatably and longitudinally movable below the panel plate to effect scanning of the magnetic coating layer of the magnetic sound record sheet, a plurality of sound transducing heads mounted on the turntable to scan said sheet along a determinable range thereof, said pressing plate being provided with a window hole outside of said range, the panel plate including a projection corresponding to said window hole to facilitate writing on the sheet through said window hole.

2. Apparatus as claimed in claim 1 comprising indication means showing the position of the turntable, and a scale operatively associated with said means and having marks in braille.

3. Apparatus as claimed in claim 1 comprising braille markings on said other surface in the part thereof corresponding to the window hole of the pressing plate.

References Cited in the file of this patent

UNITED STATES PATENTS 2,677,200 MacChesney ------------ May 4, 1954
2,808,268 Moore ------------------ Oct. 1, 1957

FOREIGN PATENTS 325,199 Great Britain ------------ Feb. 6, 1930